March 4, 1952  I. K. FOG  2,587,986
UNIDIRECTIONAL GEAR TRAIN
Filed Aug. 3, 1949
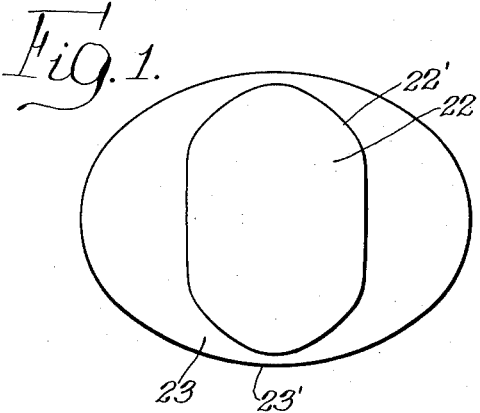
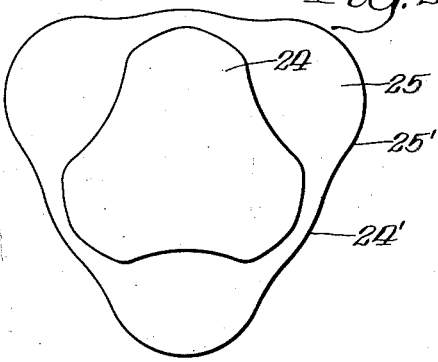
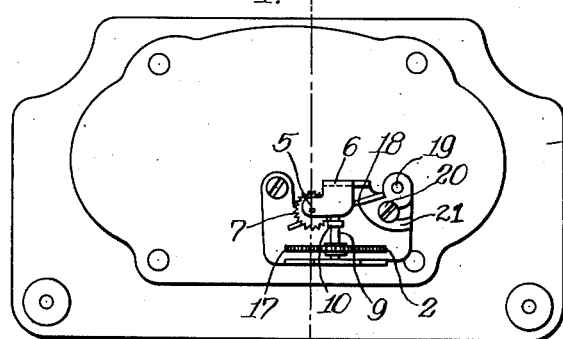
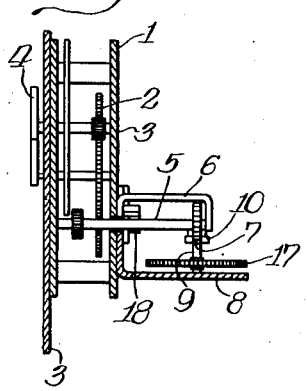
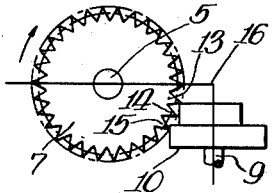
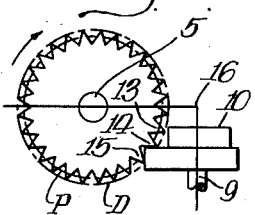
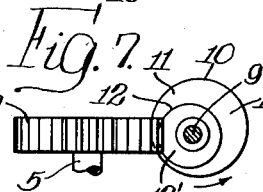
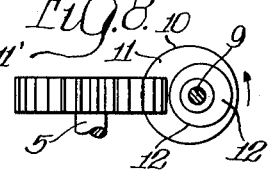
INVENTOR.
Ivar K. Fog,
BY
Brown, Jackson, Boettcher & Dienner,
Attys.

Patented Mar. 4, 1952

2,587,986

UNITED STATES PATENT OFFICE 2,587,986

UNIDIRECTIONAL GEAR TRAIN

Ivar K. Fog, King Township, Ontario, Canada, assignor to Sangamo Electric Company, Springfield, Ill., a corporation of Illinois Application August 3, 1949, Serial No. 108,247
In Canada May 28, 1949

8 Claims. (Cl. 74—812)

The principal object of this invention is to provide an extremely simple and inexpensive gear train wherein the driven spindle of the train will rotate in one direction only independent of the direction of rotation of the driving spindle.

A further important object is to provide a dependable uni-directional gear train that will operate smoothly and efficiently and will be particularly adapted for use in recording meters and other fine-gear mechanisms.

A still further object is to provide a unidirectional drive in which the uni-directional torque transferred to the driven spindle can be accomplished with the driving and driven spindles in right-angular relation.

The principal feature of the invention consists in providing on the driving spindle a novel cam having superimposed or stepped cam surfaces to "mesh" with the teeth of a gear on the driven spindle arranged in offset right-angular relation to the driving spindle whereby the cam surfaces are arranged to alternatively engage separated teeth of the gear to advance the tooth engaged outwardly of the cam for either direction of cam rotation and hence provide through the gear a uni-directional rotation of the driven spindle independent of the direction of rotation of the driving spindle.

A further important feature consists in forming superimposed or stepped cam surfaces with single cam lobes or with a plurality of lobes, with the lobes of the surfaces inter-spaced to alternatively engage the gear teeth with the number of lobes provided determining the relative speed of rotation between the driving and driven spindles.

A further important feature consists in providing a brake for the driven spindle to prevent any incremental reverse movement thereof under a condition of unbalance, which movement might effect the relationship of the gear teeth relative the cam surfaces to prevent proper drive therebetween.

Referring to the accompanying drawings, Figure 1 is an enlarged plan view of a novel "double-lobe" composite cam constructed in accordance with my invention for mounting on a driving spindle or shaft to mesh with a driven gear and provide uni-directional rotation thereof.

Figure 2 is a plan view of a "triple-lobe" composite cam to enable the carrying out of my invention.

Figure 3 is a rear elevational view of an electric meter measuring device illustrating the unidirectional drive between the "driving" spindle and the "driven" spindle operating the recording gear train.

Figure 4 is a vertical sectional view taken on the line 4—4 of Figure 3.

Figure 5 is an enlarged elevational view showing the drives of Figures 3 and 4 utilizing a "single-lobe" cam meshing with the gear of the driven spindle and showing the cam in position with the upper cam surface about to move out of contact with an actuated tooth and the lower cam surface moving into control engagement with a tooth positioned to be actuated.

Figure 6 is a view similar to Figure 5 but showing the gear revolved an amount equal to the outward displacement of the tooth engaged by the lower cam surface relative the cam and showing the upper cam surface clear of the adjacent gear teeth to permit the gear rotational movement.

Figure 7 is a plan view of the uni-directional drive shown in Figure 5 and showing the position of the cam lobes of the cam surfaces with the cam and gear in the co-operative position of Figure 5.

Figure 8 is a view similar to Figure 7 but showing the co-operative relation of the cam lobes of the cam surfaces and the gear teeth corresponding to Figure 6.

In the operation of recording devices for meters, such as a kilowatt hour meter or other recording devices such as speedometers, it is highly desirable that the movement of the recording gear train be in a direction to record independent of the direction of the driving spindle or shaft which may be tampered with by unauthorized individuals trying to reduce the recorded quantity. For instance, in an electrical meter unauthorized individuals may rewire the meter connections in an attempt to reverse the movement of the recording train and reduce the reading of consumed electrical power.

The present invention provides a drive, which is not only non-reversible but which is uni-directional for either direction of rotation of the "driving" spindle or shaft, which uni-directional drive is effected through an extremely simple intermeshing gear and pinion cam.

With reference to the drawings, Figures 3 and 4 illustrate one particular application of my invention showing an electrical meter recording device 1 equipped with my novel uni-directional drive.

As shown particularly in Figure 4, the recording device 1 illustrated comprises a plurality of inter-meshing gears forming a gear train 2 housed between the plates 3 and driving the recording pointers 4 for measuring the quantity of electrical energy and the length of time that such energy is supplied.

Operating this gear train 2 is a spindle 5 which, with respect to my novel drive, I term the "driven" spindle, and this spindle extends through the rear plate 3 and is supported at its outer end by the bracket 6 and carries adjacent its outer end the gear 7.

Supported between the upper arm of the bracket 6 and the lower bracket arm 8 is a spindle or shaft 9 in right angular relation to and axially offset from the spindle 5. This spindle 9 from the standpoint of my novel drive I term the "drive" spindle. Mounted on this spindle and arranged to "mesh" with the gear 7 is a "pinion" cam shown in enlarged detailed form in Figures 5 to 8 and generally designated as 10.

Referring to the enlarged details of Figures 5 to 8, it will be seen that the cam 10 comprises the superimposed or stepped cam surfaces 11 and 12. In the cam shown in Figures 3 to 8 each of these cam surfaces 11 and 12 is in the form of a single cam lobe, with the upper cam surface or lobe 11 being relatively smaller than the lower cam surface or lobe 12, with the maximum eccentricities of the lobes 11' and 12' being diametrically opposed with relation to the drive spindle 9.

The cam surfaces either side of the maximum eccentricities 11' and 12' are symmetrical so that the approach to the maximum eccentricities is symmetrical in either direction of rotation of the drive spindle.

The "meshing" between the gear 7 and "pinion" cam 10 will be understood upon consideration of Figures 5 and 6.

Considering the meshing relation of the cam and pinion as shown in Figure 5 and considering the movement of the gear teeth 13, 14 and 15, the upper cam surface 11 has just been rotated so that its maximum eccentricity 11' has passed the tooth 13 after forcing it outwardly from the cam 10 as permitted by the rotational movement of the gear 7. This rotation is possible by virtue of the fact that the cam 10 engages the gear teeth when the teeth are at an angular relation with respect to the right angular line 16 between the axes of the spindles 5 and 9 so that the tooth being engaged by the cam may have a component of motion outwardly of the cam upon rotation.

With the mesh relationship of Figure 5 (and Fig. 7) the cam surface 11 is actually moving outwardly of the pitch circle P of the gear leaving the tooth 14, while the tooth 13 is substantially abutting the upper surface of the stepped cam part 11, and the lower cam 12 is moving into engagement with the tooth 15 at a point adjacent the outer diameter D of the gear, the direction of rotation being assumed as that of the arrow of Figure 7.

Upon continued rotation of the drive spindle 9 and hence cam 10 the cam surface 11 will move clear of the tooth 13, and the cam surface 12, as it approaches its maximum eccentricity in the direction of rotation of the gear 7 and enters inwardly of the pitch circle P, forces the tooth 15 outwardly of the cam, which motion is accommodated by the rotation of the gear to the position of Figure 6, with the tooth 14 moving down towards the upper surface of the lower cam surface 12, Figure 6 clearly shows the upper cam surface 11 removed from the path of the tooth 13 to accommodate this movement.

Continued rotation of the drive spindle 9 will move the lower cam surface 12 clear of the tooth 14 while the upper cam surface 11 moves into engagement with the tooth 13 that has been advanced under the action of the lower cam surface into co-operative relation with the upper cam surface 11 to advance this tooth 13 outwardly of the cam.

Thus it will be seen that continued rotation of the drive spindle 9 and the cam 10 effects the rotation of the gear half tooth-by-tooth to drive the gear train 2.

As the cam surfaces 11 and 12 are symmetrical either side of their maximum eccentricities 11' and 12' the action for rotating the gear by alternate engagement with the gear teeth is identical for either direction of rotation of the driving spindle 9, and the driven spindle 5 and hence the gear train 2 connected thereto will move in one direction only for either direction of rotation of the drive spindle and cam 10.

The spindle 9 may be operated through a suitable gear 17 or may be a direct drive as desired. In the case of a meter recording movement the spindle 9 is geared to the rotating element of the meter and may rotate in different directions depending upon the way the meter is connected in the circuit.

The resultant motion of the meter-rotating element however will result in a uni-directional movement of the recording pointers 4.

As the transfer of energy from the cam 10 to the gear 7 is in the form of a series of impulses received alternatively from the cam surfaces 11 and 12 respectively, it is highly desirable that a brake be provided to prevent the driven spindle 5 from any incremental reverse movement under unbalance so that the spindle 5 will hold the new position gained upon engagement of its gear by the cam surfaces 11 and 12.

The unbalance of the driven spindle 5 may be caused through the driving of a pointer or the like which forms an eccentric load acting to alternatively assist and resist the rotational movement of the spindle.

In addition to holding the spindle 5 to the new position gained by engagement of its gear by the cam surfaces, it will be appreciated that by braking the driving spindle the impulser from the cam will be damped to provide optimum smoothness of torque transfer eliminating chattering between the gear and cam.

As shown in Figure 3, the brake provided consists of a resilient cantilever brake arm 18 adjustably mounted on the bracket 6 through the pivot 19 and lock screw 20 to engage the driven spindle 5. By swinging the arm 18 into tighter frictional engagement with the spindle 5 and clamping the slotted base 21 of the arm with the lock screw 20, the friction between the arm spindle can be increased to provide an increased braking action of the driven spindle 5 to maintain the gear teeth in correct position relative the cam surfaces 11 and 12 for correct operation.

The cam 10 shown in Figures 3 to 8 is a "single-lobe" cam, with the cam surfaces 11 and 12 alternatively engaging the gear teeth once for one rotation of the drive spindle 9.

Figure 1 shows a "double-lobe" cam which may be utilized in place of the "single-lobe" cam 10. In this case the stepped cam surfaces 22 and 23 each have two lobes or two maximum eccentricities 22' and 23' respectively, the cam surfaces being symmetrical either side of the maximum eccentricities and with the maximum eccentricities of the cam surface 23, so that these surfaces will alternatively engage the gear teeth, the drive action being as explained above with the exception that the speed of rotation of the gear 7 and hence driven spindle 5 is twice that obtained with the intermeshing gear and cam pinion 10.

Figure 2 illustrates a further form of cam which may replace the "single-lobe" cam of Figures 3 to 8 and this cam incorporates the cam surfaces 24 and 25 which are stepped or superimposed and each provided with three maximum eccentricities or lobes 24' and 25'. The lobes of the surface 24 are spaced between the lobes of the surface 25 so that the cam surfaces alternatively engage the gear teeth. Again the cam surfaces are symmetrical with respect to the lobes or maximum eccentricities 24' and 25', so that the action of the gear upon being engaged by the cam lobes is identical for either direction of rotation of the cam.

With this latter cam the speed of rotation of the spindle 5 and gear train 2 connected therewith is three times the speed obtained with the cam 10 of Figures 5 and 6.

Further lobes may be added to the cam surfaces as desired to change the relative speed between the spindle 5 and spindle 9 for a given size of gear 7.

Upon examination, particularly of Figure 6, it will be seen that should any attempt be made to operate the spindle 5 through movement of the members of the gear train or the recording pointers 5, the cam 10 will provide an effective lock or block to such movement as rotational moments of the gear 7 will only force the gear teeth into tight abutment with the cam surfaces and will impart no movement to the cam to rotate it clear of the gear teeth.

Thus it will be seen that for any reason, through tampering or otherwise, the direction of rotation of the drive spindle 9 is reversed, the spindle 5 will maintain its uni-directional rotation, and any attempt to tamper or reset the recording dials or pointers 4 will be blocked by the cam 10, providing a tamper-proof uni-directional gear train.

It will be readily appreciated that the drive is efficient and extremely simple and the intermeshing gear and "pinion" can be easily manufactured at an extremely low cost to provide a highly desirable uni-directional drive.

As the "pinion" or cam 10, 22, 23 and 24, 25 will operate normal gears, it will be appreciated that existing gear trains can be readily converted to uni-directional trains through the incorporation of my novel pinion cam.

While the cam surfaces 11 and 12 may be formed as an integral unit, it will be appreciated that they may form the cam surfaces of separate cams and other variations may be made without departing from the scope of my invention.

While particularly described in connection with a meter recording gear train, it will be appreciated that my uni-directional drive may be extended to any application where the uni-directional movement is desired within the spirit of this invention.

What I claim as my invention is:

1. In a uni-directional gear train, a driving spindle, a driven spindle in angular relation thereto, a gear on said driven spindle, cam means mounted on said drive spindle and presenting non-coplanar peripherally spaced cam lobes; each of said lobes being symmetrically formed on either side of their points of maximum eccentricity whereby they are adapted to mesh with the teeth of said gear to actuate the teeth engaged thereby outwardly of said drive spindle, thereby to rotate said gear and driven spindle in a given direction independent of the direction of rotation of said driving spindle.

2. In a uni-directional gear train, a pair of right angularly arranged axially offset spindles, a gear mounted on one of said spindles, a pinion mounted on the other of said spindles and meshing with said gear, said pinion being in the form of a cam having stepped cam surfaces formed symmetrically on either side of their points of maximum eccentricity whereby said surfaces are adapted alternatively to engage the teeth of said gear to move said engaged teeth outwardly therefrom to rotate the gear in the direction of movement of said teeth moved outwardly by said cam independent of the direction of rotation of said cam.

3. In a uni-directional gear train, right angularly arranged axially offset driving and driven spindles, a gear mounted on said driven spindle, a cam having a pair of cam surfaces carried by said driving spindle to rotate in planes at right angles to the plane of said gear with said surfaces being formed to alternately engage adjacent separated teeth of said gear with one of said cam surfaces while the second cam surface is out of engagement with said gear; said one cam surface engaging a tooth of said gear and moving same upwardly with a wedging engagement thereby to rotate the gear and bring the next successive tooth adjacent said second actuating cam surface, for driving engagement therewith, said one cam surface then moving out of engagement with said gear while said other cam surface moves into engagement with said next successive positioned tooth to move same upwardly by advancing with a wedging action toward said gear's pitch circle and rotate said gear to bring said tooth so engaged by said second cam surface into position to be engaged by the first-mentioned cam surface upon its return engagement with said gear.

4. In a uni-direction train, a drive spindle, a driven spindle in right angularly offset relation to said drive spindle, a gear mounted on said driven spindle, a cam having a pair of non-coplanar cascaded cam surfaces carried by said drive spindle and rotatable in planes offset from said driven spindle and perpendicular to the plane of said gear, said cam surfaces being symmetrical on either side of their points of maximum eccentricity whereby they are arranged to alternatively engage, upon rotation of said drive spindle in either direction, successive teeth of said gear, each cam surface independently and alternately invading the pitch circle thereof to advance the tooth so engaged upwardly thereby to rotate said gear and place the next successive tooth in position to be advanced by the other of said cam surfaces.

5. In a uni-directional train, a drive spindle and a dirven spindle in right angular axially offset relation, a gear mounted on said driven spindle, a pair of non-coplanar cam surfaces carried by said drive spindle and rotatable in planes offset from said driven spindle and perpendicular to the plane of said gear, each of said cam surfaces being formed with at least one lobe the path of which on rotation of said drive spindle enters inwardly of the pitch circle of said gear, the lobes of said cam surfaces being alternatively and symmetrically arranged whereby said cam surfaces, upon rotation of said drive spindle in either direction alternatively engage a gear tooth at a point adjacent the outer diameter circle of said gear and advance through said gear's pitch circle thereby to drive said gear in a single direction to rotate said gear a predetermined angular distance so as to place the succeeding adjacent tooth in position to be advanced by the other of said cam surfaces; said first cam surface being withdrawn from a tooth engaging position during tooth driving engagement by said second cam surface of a suceeding tooth due to the offset relation of said cam surfaces and lobes.

6. A device as set forth in claim 5 in which said cam surfaces each comprise a plurality of cam lobes, each being symmetrically formed on either side of their point of maximum eccentricity so that said gear may be rotatably advanced with a smooth driving action in a single rotational direction irregardless of the direction of rotation of said drive spindle and cam surfaces.

7. A device as claimed in claim 5 in which brake means are provided comprising an arm mounted adjacent said driven shaft and having one end in attritional engagement with said shaft for braking said driven shaft during non-rotational driving of said gear to hold same in the positions to which it has been advanced by said cam surfaces.

8. A device as set forth in claim 5 in which brake means are provided for braking said driven shaft, said brake means comprising a braking arm having one end in contact with said driven shaft and a bracket for pivotally mounting said arm adjacent said shaft, said bracket having slot means therein whereby said arm adjustably may be rotated about said pivotal mounting thereby to vary its braking contact with said driven shaft.

IVAR K. FOG.

REFERENCES CITED

The following references are of record in the file of this patent:

UNITED STATES PATENTS

| Number | Name | Date |
|---|---|---|
| 93,485 | Shaw | Aug. 10, 1869 |
| 278,078 | Batt | May 22, 1883 |
| 480,671 | Richards | Aug. 9, 1892 |
| 491,993 | Edison | Feb. 21, 1893 |
| 879,496 | Ryon | Feb. 18, 1908 |
| 1,176,936 | Waldon | Mar. 28, 1916 |
| 1,683,758 | Candee et al. | Sept. 11, 1928 |